United States Patent [19]

Jones

[11] Patent Number: 5,650,057

[45] Date of Patent: *Jul. 22, 1997

[54] CHLORIDE ASSISTED HYDROMETALLURGICAL EXTRACTION OF METAL

[75] Inventor: David L. Jones, Delta, Canada

[73] Assignee: Cominco Engineering Services Ltd., Vancouver, Canada

[*] Notice: The term of this patent shall not extend beyond the expiration date of Pat. No. 5,431,788.

[21] Appl. No.: 488,128

[22] Filed: Jun. 7, 1995

Related U.S. Application Data

[63] Continuation-in-part of Ser. No. 425,117, Apr. 21, 1995, which is a continuation-in-part of Ser. No. 98,874, Jul. 29, 1993, Pat. No. 5,431,788.

[51] Int. Cl.$^6$ ............................................. C25C 1/00
[52] U.S. Cl. .................. 205/579; 205/574; 205/602; 205/604; 205/606; 205/607; 423/27; 423/36
[58] Field of Search ................... 205/579, 574, 205/602, 604, 606, 607; 423/27, 36

[56] References Cited

U.S. PATENT DOCUMENTS

| 4,008,076 | 2/1977 | Junghanss et al. | 75/101 R |
| 5,431,788 | 7/1995 | Jones | 204/104 |

Primary Examiner—Arun S. Phasge
Attorney, Agent, or Firm—Elbie R. de Kock

[57] ABSTRACT

A process for the extraction of a metal from an ore or concentrate comprises subjecting the ore or concentrate to pressure oxidation in the presence of oxygen and an acidic solution containing halogen ions and a source of bisulphate or sulphate ions, such as $H_2SO_4$. The metals which can be extracted by the process comprises copper as well as non-cuprous metals such as zinc, nickel and cobalt. During pressure oxidation the metal may be precipitated as an insoluble basic salt, such as basic copper sulphate, or substantially completely solubilized and precipitated later as the basic metal salt.

18 Claims, 8 Drawing Sheets

CHLORIDE ASSISTED HYDROMETALLURGICAL EXTRACTION OF METAL

CROSS REFERENCE TO RELATED APPLICATION

This application is a continuation-in-part of U.S. patent application Ser. No. 08/425,117 filed Apr. 21, 1995, the entire contents of which is incorporated herein by reference which is a continuation-in-part of Ser. No. 08/098,874 filed Jul. 29, 1993 now U.S. Pat. No. 5,431,788.

FIELD OF THE INVENTION

This invention relates to the hydrometallurgical treatment of metal ores or concentrates. In particular, it relates to the extraction of metals from ores in the presence of halogen ions, such as chloride ions. It also relates to the extraction of nickel and cobalt from laterite ores.

BACKGROUND OF THE INVENTION

Hydrometallurgical treatment of copper sulphide ores, such as chalcopyrite ($CuFeS_2$), is problematical because the severe conditions required in a pressure oxidation step for the effective leaching of copper from these ores results in oxidation of the sulphide in the ore to sulphate, resulting in the generation of large amounts of acid which requires expensive neutralization. Attempts have been made to render the sulphide concentrate leachable under relatively milder conditions under which the sulphide would only be oxidized to elemental sulphur and not all the way through to sulphate. These attempts include the pretreatment of the concentrate prior to the pressure oxidation step to render the sulphide concentrate more readily leachable, and the leaching of the concentrate in the presence of chloride ions, such as described in U.S. Pat. No. 4,039,406. In this process, the copper values in the concentrate are transformed into a solid basic copper sulphate from which the copper values must then be subsequently recovered, as described in U.S. Pat. No. 4,338,168. In the process described in U.S. Pat. No. 4,039,406 a significant amount (20–30%) of sulphide in the ore or concentrate is still oxidized to sulphate, resulting in greater oxygen demand during the pressure leach and the generation of sulphuric acid. This is particularly unfavourable for low grade concentrates, where the S/Cu ratio is high.

The present invention provides a process for the hydrometallurgical extraction of copper and other metals in the presence of halogen ions, such as chloride and bromide in solution.

SUMMARY OF THE INVENTION

According to the invention, there is provided a process for the extraction of metal from a sulphide ore or concentrate, comprising the steps of subjecting the ore or concentrate to pressure oxidation in the presence of oxygen and an acidic chloride solution to obtain a resulting pressure oxidation filtrate and an insoluble basic metal sulphate salt, characterized in that the pressure oxidation is conducted in the presence of a source of bisulphate or sulphate ions which is selected from the group consisting of sulphuric acid and a metal sulphate which hydrolyzes in the acidic solution and wherein the amount of the source of bisulphate or sulphate ions which is added contains at least the stoichiometric amount of sulphate or bisulphate ions required to produce the basic metal sulphate salt less the amount of sulphate generated in situ in the pressure oxidation.

According to one particular embodiment of the invention, the process further comprises the steps of recycling the pressure oxidation filtrate to the pressure oxidation step; leaching the basic metal sulphate salt produced by the pressure oxidation in a second leaching with an acidic sulphate solution to dissolve the basic metal salt to produce a leach liquor containing metal sulphate in solution and a resulting solid residue; separating the leach liquor from the solid residue; subjecting the leach liquor to a solvent extraction process to produce metal concentrate solution and a raffinate; and recycling the raffinate to the second leaching step. In this embodiment, the pressure oxidation may be carried out at a temperature of from about 115° C. to about 175° C. The pressure oxidation may further be carried out under an oxygen partial pressure of from about 50 psig (345 kPa) to about 250 psig (1725 kPa).

Also according to the invention, there is provided a process for the extraction of a non-cuprous metal from a metal ore or concentrate, comprising the step of subjecting the ore or concentrate to pressure oxidation in the presence of oxygen and an acidic solution containing halogen ions and a source of bisulphate or sulphate ions to form a solution of said non-cuprous metal, wherein said source of bisulphate or sulphate ions is selected from the group consisting of sulphuric acid and a metal sulphate which hydrolizes in said acidic solution. In this specification, M represents the metal being extracted, such as copper, zinc, nickel or cobalt.

The halogen concentration in the pressure oxidation filtrate, which is recycled to the pressure oxidation step, is preferably maintained in the range of from about 8 g/L to about 20 g/L, preferably about 11 g/L to about 14 g/L, and more preferably at about 12 g/L.

Reference is made to the use of chloride in the specification. However, it will be appreciated that the chloride could be substituted with bromide, if desired.

The term "non-cuprous metal" as used herein refers to a metal other than copper.

The second leaching is preferably effected at a pH in the range of from about 1.3 to about 2.2. It has been found that this maximizes the solution of base metal and minimizes the solution of iron. More preferably, the second leaching is effected in a pH range of from about 1.6 to about 1.9.

The second leaching may be carried out at a temperature of from about 20° C. to about 70° C., preferably, from about 35° C. to about 45° C.

For the second leaching, residence times of up to one hour or less, such as 15 to 20 minutes, have been found to be adequate.

The raffinate may be split into a first portion comprising about two-thirds of the raffinate and a second portion comprising about one-third of the raffinate and the first portion may be recycled to the second leaching and the second portion may be subjected to a secondary solvent extraction to produce a secondary lixiviant and a secondary raffinate. The secondary lixiviant may be used as extractant in the solvent extraction of the leach liquor.

In another embodiment of the invention, the pressure oxidation is carried out at a predetermined molar ratio of $H^{3O}/M$, where $H^+$ represents the hydrogen ions in the acidic chloride solution and M represents the metal in the ore or concentrate, so that the pressure oxidation filtrate contains a first portion of the metal in the ore or concentrate and the basic metal salt contains a second portion of the metal in the ore or concentrate and further comprising the steps of separating the pressure oxidation filtrate and the basic metal salt; leaching the basic metal salt in a second leaching step with an acidic sulphate solution to dissolve the metal salt to produce a second metal solution and a solid residue; and subjecting the pressure oxidation filtrate and the second metal solution to solvent extraction to produce concentrated metal solution for electrowinning of metal therefrom.

The invention also extends to copper, zinc, nickel and cobalt whenever produced by the process according to the invention.

Further objects and advantages of the invention will become apparent from the description of preferred embodiments of the invention below.

DETAILED DESCRIPTION OF PREFERRED EMBODIMENTS

The process according to the invention is flexible enough to treat a range of copper concentrates in which the grade of copper varies from low, i.e. about 15% copper or less, to high grade, i.e. about 35% copper or more.

Broadly, the process comprises a pressure oxidation stage, an atmospheric leach stage, one or more solvent extraction stages and an electrowinning stage. Different grades of concentrate require different treatment in the pressure oxidation stage, requiring different modes of operation. These modes of operation are termed Mode A and Mode B, respectively. In Mode A, which is effective when high grade copper ores are leached, copper is not leached in the pressure oxidation stage. In Mode B, which is effective when medium and low grade copper ores are leached, copper is leached in the pressure oxidation stage.

Each of the two modes of operation will now be described in turn.

Process Mode A

Figure 1:
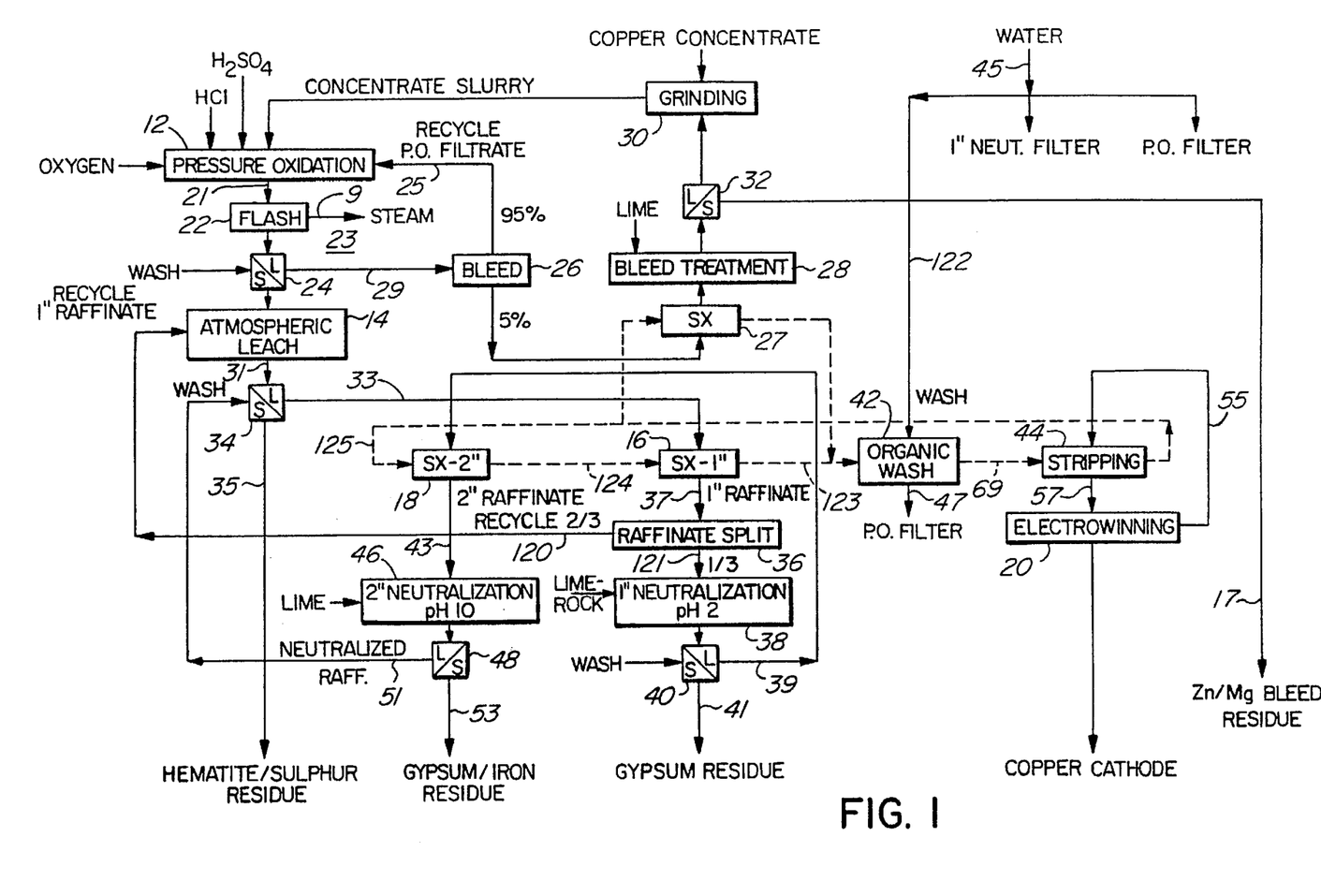
FIG. 1 is a flow diagram of a hydrometallurgical copper extraction process according to one embodiment of the invention, which is suitable for the treatment of high grade copper ores or concentrates.

FIG. 1 is a flow diagram of Mode A. The process comprises a pressure oxidation stage 12 in a pressure oxidation vessel or autoclave, an atmospheric leach stage 14, primary and secondary solvent extractant stages 16 and 18, respectively, and an electrowinning stage 20.

In the pressure oxidation stage 12, all copper minerals are converted to basic copper sulphate, $CuSO_4.2Cu(OH)_2$. The treatment is carried out with oxygen in the presence of an acidic chloride solution. Oxygen, as well as HCl and $H_2SO_4$ are introduced into the autoclave for this purpose. The temperature in the autoclave is about 130°–150° C. and the pressure about 100–200 psig (1380 kPa). This is total pressure comprising oxygen pressure plus steam pressure. The retention time is about 0.5–2.5 hours and the process is normally carried out in a continuous fashion in the autoclave. However, the process can also be carried out in a batch-wise fashion, if desired.

The solids content in the autoclave is maintained at about 12–25%, i.e. 150–300 g/L solids as determined by the heat balance and viscosity limitations.

The slurry produced in the autoclave is discharged through a series of one or more flash tanks 22 to reduce the pressure to atmospheric pressure and the temperature to 90°–100° C. The liquid part of the slurry is referred to as the product solution from the pressure oxidation stage 12 and is indicated by reference numeral 21.

The slurry from the flash tank(s) 22 is filtered, as shown at 24, and the resultant filter cake is washed thoroughly to remove entrained liquor as much as possible.

The pressure oxidation filtrate from the filtration 24 is recycled to the pressure oxidation stage 12 but there is a small bleed of about 5%, as shown at 26. This bleed 26 is determined by the concentration of the soluble metals in the ore or concentrate which may dissolve during the pressure oxidation stage 12. The bleed 26 is treated at 28 with lime to remove metals such as zinc and magnesium as solid residues, which are present in the copper concentrate, and to counteract buildup of these metals in the pressure oxidation circuit. The pressure oxidation circuit is the circuit from the pressure oxidation stage 12 to the flash tank(s) 22 to the filtration 24 to the bleed 26 and back to the pressure oxidation stage 12. It is indicated by reference numeral 23.

The bleed 26 is subject to a solvent extraction, as shown at 27, prior to the bleed treatment 28. The solvent extraction 27 is carried out by means of a suitable organic extractant to remove copper from the bleed 26. This solvent extraction is associated with the solvent extraction stages 16 and 18 and will be referred to again when the latter two solvent extraction stages are described.

Prior to the pressure oxidation stage 12, the copper concentrate is first subjected to a regrind, as shown at 30, to reduce the particle size to about 97% minus 325 mesh, which corresponds to P80 (80% passing) 15 micron. The regrind 30 is carried out in solution recycled from the bleed treatment 28. Thus, the slurry from the bleed treatment 28 is subjected to a liquid/solid separation, as shown at 32, and the solution is recycled to the regrind 30 and the zinc/magnesium bleed residue is discarded, as shown at 17.

The solution which is recycled to the regrind 30 is an alkaline chloride liquor at about pH 10. Use of this liquor minimizes water input into the pressure oxidation circuit 23 which is important in maintaining heat balance and in preserving the chloride solution in the pressure oxidation circuit 23 as much as possible.

As stated above, copper is not leached in the pressure oxidation stage 12 but is converted to an insoluble basic copper salt. The feed solution to the pressure oxidation stage 12, which is the leach liquor being recycled from the filtration 24 is indicated by reference numeral 25. Although there is copper present in the feed solution 25, there is no additional copper leached, i.e. the process is operated so that the copper concentration in the feed solution 25 to the pressure oxidation stage 12 is equal to the copper concentration in the product solution 21 from the pressure oxidation stage 12. This is indicated as: $\Delta[Cu^{2+}]=0$.

The feed solution 25 to the pressure oxidation stage 12 contains about 15 g/L Cu and 12 g/L Cl, together with about 30–55 g/L sulphuric acid. The acid is added in the form of make up $H_2SO_4$ (usually 93%). The product solution 21 from the pressure oxidation stage 12 also contains about 15 g/L Cu and 11–12 g/L Cl but is at about pH 3. There is substantially no acid left in the product solution 21 as it is all consumed in the pressure oxidation stage 12 to form the basic copper salt.

As referred to above, the liquid pressure feed 25 to the pressure oxidation stage 12 is made up partly of recycled filtrate to which $H_2SO_4$ is added. The immediate effect of adding the acid to the filtrate is to increase the acidity of the filtrate which is fed to the autoclave for the pressure leaching stage 12, but the most important effect, surprisingly, has been found to be that the addition of the acid, or more specifically the sulphate ions, actually suppresses the oxidation of sulphur emanating from the concentrate in pressure oxidation stage 12.

Typically the oxidation of sulphur that is experienced if no acid is added is about 25–30% of the feed sulphur in the concentrate, as is the case with the process described in U.S. Pat. No. 4,039,406. However, if acid is added, it has been found that the sulphur oxidation to sulphate is reduced to about 5–10%. This improvement has substantial beneficial effects on the hydrometallurgical extraction process. The oxidation of sulphur to sulphate creates additional costs in several ways, such as additional oxygen required for the reaction, additional reagent required to neutralize the acid so formed by the oxidation and provision must be made for heat removal due to the oxidation of sulphur to sulphate which is very exothermic. This actually limits the throughput of the autoclave in which the pressure leaching stage 12 takes place.

The chemistry of the reaction in the pressure oxidation stage 12 is believed to be altered by the addition of the acid as follows:

No acid addition:

$$3CuFeS_2+21/4O_2+2H_2O \rightarrow [CuSO_4.2Cu(OH)_2]+3/2\ Fe_2O_3+5S^0 \quad (1)$$

With acid addition:

$$3CuFeS_2+15/4O_2+H_2O+H_2SO_4 \rightarrow CuSO_4.2Cu(OH)_2+3/2\ Fe_2O_3+6S^0 \quad (2)$$

In both reactions, the copper is precipitated in the form of a basic copper salt, which has been found to comprise mostly basic copper sulphate.

In the first reaction it appears that the sulphate of the basic copper sulphate is supplied by oxidation of the feed sulphur in the concentrate, whereas in the second reaction it appears to be supplied by the sulphate ions in the acid which is added to the autoclave, thus obviating the need for the oxidation of sulphur to sulphate. Thus, in the second reaction, there is a nett consumption of sulphate ions to form the basic copper salt. The amount of sulphuric acid needed to suppress sulphur oxidation has been found experimentally to be about 25 to 75 grams per liter, depending on the type of concentrate and the percentage solids in the concentrate.

In actual test work, there is more sulphur oxidation than is predicted by either reaction. The first reaction predicts one sixth or 16.7% of the sulphur to be oxidized, whereas experimentally about 25%–30% is found. With acid addition, experiments indicate that about 2–16% sulphur is oxidized to sulphate, rather than the zero oxidation that would be predicted if the second reaction as written was the only reaction taking place. Therefore, these reaction equations do not reflect exactly what is happening in the pressure leaching stage 12 but are only an approximation.

Chloride is conserved as much as possible in the pressure oxidation circuit 23 but typically about 3–10% chloride is lost per pass into the solid product at the filtration 24. Thus, the chloride must be made up by the addition of HCl or another source of chloride to provide 12 g/L chloride in the feed solution 25. The chloride losses are minimized by thorough washing of the solids from the pressure oxidation stage 12 on the filter 24. The amount of wash water is constrained by the requirement to maintain a water balance in the pressure oxidation circuit 23. The only water loss from the circuit 23 is in the steam 29 from the flashing step 22 and in the filter cake after the filtration 24. Hence, the need to use the recycled solution from the bleed treatment 28 to slurry up the concentrate in the grinding step 30, and thus minimize fresh water input from the concentrate to the pressure oxidation step 12.

It has been found to be advantageous to maintain at least 15 g/L Cu in the product solution 21 from the pressure oxidation stage 12 so as to counteract chloride loss in the form of solid basic copper chloride, $CuCl_2.3Cu(OH)_2$, which can occur if insufficient copper is present in solution to allow basic copper sulphate to form:

$$4CuCl_2+6H_2O \rightarrow CuCl_2.3Cu(OH)_2+6HCl \quad (3)$$

This reaction can be counteracted by the addition of sufficient acid into the autoclave during the pressure oxidation stage 12 to maintain at least enough copper in solution to satisfy the stoichiometric requirements for Cl as $CuCl_2$. For 12 g/L Cl in solution, the stoichiometric amount of Cu is:

$$\frac{63.5}{71} \times 12 = 10.7\ g/L\ Cu$$

Thus, 15 g/L Cu is a safe minimum to prevent a significant chloride loss in the form of the basic copper salt.

On the other hand, the copper concentration in the product solution 21 from the pressure oxidation stage 12 should be kept as low as possible to counteract the formation of CuS by the reaction of elemental sulphur with aqueous copper sulphate. This reaction can occur during the pressure oxidation stage 12 or in the slurry after discharge from the autoclave but before the filtration step 24:

$$3CuSO_4(aq)+4S^0+4H_2O \rightarrow 3CuS(s)+4H_2SO_4 \quad (4)$$

This reaction is particularly undesirable because CuS is insoluble in the dilute acid conditions of the atmospheric leaching stage 14. Thus, the copper is not recovered and this results in the loss of copper to the final residue.

To counteract the formation of CuS it is necessary to keep the copper concentration in the product solution 21 as low as possible, i.e. below 30 g/L for some concentrates. The tendency to CuS formation is apparently related to the type of concentrate being treated, with the medium to high grade concentrates being more susceptible to CuS formation.

Thus, although a high copper concentration in the product solution 21 does not present a problem with the low grade concentrates, it cannot be tolerated with the higher grade concentrates.

As is known to date, high grade concentrates, i.e. above 35% copper, are best treated to produce as low a copper concentration in the product solution 21 as possible, i.e. below 25 g/L Cu.

Given the need to maintain at least 15 g/L Cu in solution in the pressure oxidation circuit 23, there is an optimum range of copper concentration of from 15 to 25 g/L Cu for high grade concentrates. With medium grade concentrates, the upper limit can be stretched considerably and for low grade ore, the copper concentration does not play a significant role.

The copper concentration in the pressure oxidation filtrate 29 can be controlled simply by adding the required amount of acid into the feed solution 25 to the pressure oxidation stage 12. More acid results in a higher copper concentration due to the dissolution of the basic copper sulphate:

$$CuSO_4.2Cu(OH)_2(s)+2H_2SO_4 \rightarrow 3CuSO_4(aq)+4H_2O \qquad (5)$$

The addition of about 1 g/L acid results in an increase in copper concentration of about 1 g/L. The actual concentration of acid required is determined empirically by comparing the assays of feed solution 25 to the pressure oxidation stage 12 and the product solution 21 from the pressure oxidation stage 12 to satisfy $\Delta[Cu^{2+}]=0$. The volume of solution in the circuit 23, however, is determined by the heat balance.

The percentage by weight of solids in the feed of copper concentrate slurry to the pressure oxidation stage 12 can be varied at will. The weight of concentrate solid fed to the pressure oxidation stage 12 is determined by the amount of copper to be recovered. The weight of the solution is determined mainly by the heat balance in the pressure oxidation stage 12.

The desired operating temperature in the pressure oxidation stage 12 is about 150° C. and the heat must be supplied largely by the heat of reaction of the sulphide minerals with the high pressure oxygen in the autoclave. For high grade concentrates, such as will be treated by the Process Mode A currently being described, this means a relatively low S/Cu ratio and thus a smaller heat production per tonne of copper treated in the autoclave. Much of the heat evolved is due to oxidation, not of copper, but of the other two main elements in the concentrate, iron and sulphur. If the grade of the concentrate is high, then the ratio of S/Cu and Fe/Cu is low, hence a lower heat production.

To reach operating temperature from a starting temperature of say 50° to 80° C., which is typical for the pressure oxidation filtrate 29 which is recycled after the filtration 24, it is necessary to control the amount of water that must be heated, since this is the main heat sink in the pressure oxidation stage 12. It is impractical to cool or heat the slurry inside the autoclave by indirect means, such as by means of heating or cooling coils, because of rapid scale formation on all surfaces, particularly heat exchangers, leading to very poor heat transfer characteristics. Direct heating or cooling by injection of steam or water is also impractical due to water balance considerations. Therefore, it is required that the heat balance be maintained by balancing heat production from reaction heat with the heat capacity of the feed materials, i.e. the feed solution 25 being recycled and the concentrate slurry. The main variable that can be controlled here is the volume of the feed solution 25. This is one of the distinguishing features between Modes A and B. In Process Mode B, still to be described, the heat evolution is much greater, expressed as heat per tonne of copper product. Therefore, it is possible to use more solution volume in the feed 25 to the pressure oxidation stage 12.

Once the solution volume is fixed, the acidity of the solution can be determined, since the total mass of acid is determined by the need to maintain $\Delta[Cu^{2+}]=0$. Typically, for a high grade concentrate, about 35–55 g/L acid will be required.

It has been found to be beneficial to add small concentrations of certain surfactants which change the physical and chemical characteristics of liquid elemental sulphur ($S^o$) in the autoclave during the pressure oxidation stage 12. Surfactants such as lignin sulphonate and quebracho added to the pressure oxidation feed solution 25 in small amounts, i.e. 0.1 to 3 g/L can reduce the viscosity of the liquid sulphur and also change the chemistry in the autoclave.

Additions of surfactants can reduce sulphur oxidation in ways that are not well understood, but are beneficial to the process. It is believed that this is due to lower viscosity, resulting in lowered tendency for liquid sulphur and solids to be held up within the autoclave, thus reducing the retention time for these materials, and hence the reduced tendency for sulphur oxidation to occur.

Also it has been found that more complete reaction of the copper minerals takes place if surfactants are added, apparently because of lower viscosity sulphur, which does not "wet" unreacted sulphide minerals, and thus allows the desired reaction to proceed to completion.

Reaction (5) describes how adding sulphuric acid to the pressure oxidation feed 25 will control the copper concentration in the pressure oxidation filtrate 29. The overall reaction for the pressure oxidation with sulphuric acid addition for a chalcopyrite ore is given by reaction (2) above.

A similar reaction can be written using $CuSO_4$ as the source of sulphide ions instead of $H_2SO_4$:

$$3CuFeS_2+15/4O_2+3H_2O+3/2\ CUSO_4 \rightarrow 3/2\ CuSO_4.2Cu(OH)_2+3/2\ Fe_2O_3+6S^o \qquad (6)$$

It is noteworthy that there are 3/2 moles of sulphate required as copper sulphate in reaction (6) compared to one mole of sulphuric acid in reaction (2). Therefore, if $CuSO_4$ is to be used as the source of sulphate ions instead of sulphuric acid, it is necessary to use 1.5 times as many moles of $CuSO_4$. To take this into account, the inventor has developed the concept of Excess Sulphate Equivalent, which allows the calculation of how much acid to add to the pressure oxidation feed solution 25 in order to achieve a target copper concentration and still take into account reaction (6).

By taking reaction (6) into account, it is possible to calculate "a priori" the amount of acid required for constant copper concentration in the pressure oxidation filtrate 29. The concept of Excess Sulphate Equivalent is helpful:

Excess Sulphate Equivalent is equal to the sulphate available in the pressure oxidation feed solution 25 for formation of basic copper sulphate during the pressure oxidation stage 12. The sulphate available is that which is in excess of a defined Base Level of $CuSO_4$ and $CuCl_2$.

Base Level of CuSO4 and $CuCl_2$ is sufficient to support chloride in solution at 12 g/L in the form of $CuCl_2$ and, in addition, about 4.3 g/L Cu as $CuSO_4$. The concentration of $CuCl_2$ corresponding to 12 g/L chloride in solution is 134.5/71*12=22.7 g/L $CuCl_2$, which contains 10.7 g/L Cu in solution. The additional 4.3 g/L copper therefore means a total of 15 g/L copper combined as $CuCl_2$ and $CuSO_4$ in the Base Level.

Sulphate available is then the total sulphate as $CuSO_4$ less the Base Level. For instance, if the total copper concentration is 28 g/L in the pressure oxidation filtrate 29, then the sulphate available is 28−15=13 g/L Cu * 98/63.5=20 g/L $H_2SO_4$ as available sulphate from $CuSO_4$.

Excess Sulphate Equivalent (ESE) is then calculated from the available sulphate from $CuSO_4$ by dividing by 1.5:

ESE={Available Sulphate as $CuSO_4$}/1.5

Thus, in the example of 28 g/L total copper concentration or 20 g/L available sulphate from $CuSO_4$, there is 20/1.5= 13.3 g/L ESE from $CuSO_4$.

Finally, if the target free acid equivalent is, say, 52 g/L $H_2SO_4$ in the pressure oxidation feed solution 25, then the amount of acid required is 52 less the ESE (13.3 g/L) or 38.7 g/L $H_2SO_4$. This is the amount that must be added to the feed solution 25 to the pressure oxidation stage 12 to produce a constant copper concentration in the pressure oxidation filtrate 29, i.e. the Base Level of 15 g/L Cu.

Other reactions can be written using $Fe_2(SO_4)_3$ and $ZnSO_4$ as the source of sulphate ions instead of $H_2SO_4$. In the case of $ZnSO_4$, the zinc is assumed to hydrolyze to basic zinc sulphate, $ZnSO_4.3Zn(OH)_2$, which is a basic salt of Zn analogous to basic copper sulphate. These reactions are given below as reactions (7) and (8).

$3CuFeS_2+15/4O_2+2H_2O+1/3\ Fe_2(SO_4)_3 \rightarrow CuSO_4.2Cu(OH)_2+11/6Fe_2O_3+6S^0$ (7)

$3CuFeS_2+15/4O_2+13/3H_2O+4/3\ ZnSO_4 \rightarrow CuSO_4.2Cu(OH)_2+6S^0+Fe_2O_3+1/3\ \{ZnSO_4.3Zn(OH)_2.4H_2O\}$ (8)

The solids from the pressure oxidation stage 12 after the filtration 24, are treated in the atmospheric leaching stage 14 at about pH 1.5 to pH 2.0 using raffinate from the primary leaching stage 16, which is acidic, to dissolve the basic copper sulphate. The leaching 14 takes place at a temperature of about 40° C. for a retention time of about 15–60 minutes. The percentage solids is typically about 5–15% or about 50–170 g/L, although it is possible to operate the process outside this range.

During the atmospheric leaching stage 14, the basic copper salts dissolve almost completely with very little of the iron present in the concentrate going into solution.

Typically, the leach liquor 33 produced after the liquid/solid separation 34 contains about 10–20 grams per litre copper, depending on the percentage solids feed to the leach 14, with 0.1–1.0 g/L iron and about 0.1–1.0 g/L chloride. Much of this iron and chloride are derived from the feed raffinate 37 rather than the solids from pressure oxidation, i.e. they are recycled. Typically about 0.1–0.2 g/L iron and chloride dissolve per pass.

The copper extraction has been found to be about 95–98% based on the original feed to the pressure leaching stage 12. Iron extraction to solution has been found to be less than about 1%.

The slurry 31 from the atmospheric leaching stage 14 is difficult if not impossible to filter, but settles well. In view of the need to wash the leach solids very thoroughly, the slurry 31 is therefore pumped to a counter current decantation (CCD) wash circuit, symbolically indicated as a solid/liquid separation 34 in FIG. 1. In the CCD circuit 34, the solids are fed through a series of thickeners with wash water added in the opposite direction. By this method, the solids are washed and entrained solution removed. About 3 to 5 thickeners (not shown) are required with a wash ratio (water to solids) of about 5 to 7 to reduce entrained liquor down to less than 100 ppm Cu in the final residue.

The thickener underflow from the last thickener is the final residue stream 35 at about 50% solids. This can be treated for the recovery of precious metals, such as gold and silver, or sent to tailings. Precious metals may be recovered by known methods, such as cyanidation. The main constituents of the stream 35 are hematite and elemental sulphur, which may be recovered by flotation if market conditions warrant.

The thickener overflow from the first thickener is the product solution 33 which is fed to the primary solvent extraction stage 16, as shown. This solution contains about 12 g/L Cu, 1 g/L Cl and 0.5 g/L Fe.

The optimum copper concentration is determined by the ability of the solvent extraction stage 16 to extract the maximum copper from the solution 33. Since a fraction of about one-third of the raffinate from the solvent extraction stage 16 is eventually neutralized, it is important to minimize the copper content of this raffinate.

Solvent extraction performs best on dilute copper solutions due to the fact that a concentrated copper solution results in a higher acid concentration in the raffinate which tends to lower extraction efficiency. More concentrated solutions are, however, cheaper to treat from a capital cost point of view, since the volume is less. Above a certain point, though, the increased concentration does not reduce the size of the solvent extraction unit, since (i) there is a maximum organic loading and (ii) aqueous volume is generally kept equal to organic volume for mixing purposes by means of aqueous recycle. Therefore, the total volume of organic extractant and aqueous solution is only determined by the volume of organic extractant. The maximum organic loading and hence volume of organic is determined by the concentration and characteristics of the particular organic solvent selected. For the typical solvent, e.g. LIX™ reagent from Henkel Corporation, the maximum loading per pass at 40% volume concentration in diluent is about 12 g/L Cu. Therefore, the product solution 33 also should contain about 12 g/L Cu.

The copper is extracted from the product solution 33 from the CCD thickener overflow in two stages of extraction in the primary solvent extraction stage 16 to produce a raffinate 37 with about 20 g/L free acid and about 0.3 to 1 g/L Cu. Most of this raffinate 37 is recycled to the atmospheric leaching stage 14 but about 25 to 30% is surplus to the acid requirements of the atmospheric leaching stage 14 and must be neutralized. This surplus 121 is split off as shown at 36 and neutralized.

The neutralization is effected in two stages to maximize copper recovery and to prevent possible environmental problems with the neutralization residue due to copper content, i.e. the unrecovered copper from the raffinate 37 will precipitate upon neutralization and can then re-dissolve later, in a tailing pond, for example.

The first stage neutralization takes place at pH 2 to pH 3, as shown at 38, using limerock, which is very economical as a reagent, compared with lime. The neutralization product is filtered at 40 and the resultant solids are washed with water from the external source 45. The solids, which are mainly gypsum and iron hydroxides, are discarded, as shown at 41.

The filtrate 39 is sent to the secondary solvent extraction stage 18 for the recovery of residual copper values. The secondary solvent extraction 18 benefits from the primary neutralization 38 and results in a very low copper concentration in the secondary raffinate 43, typically from about 0.03 to 0.06 g/L Cu.

As indicated by the broken lines in FIG. 1, the secondary solvent extraction stage 18 uses the same organic extractant as the primary solvent extraction circuit 16. This is also tied in with the solvent extraction 27 of the pressure oxidation filtrate bleed 26. The organic extractant which is washed at 42 with wash water 122 from an external source 45, and stripped at 44 is recycled to the secondary solvent extraction stage 18 and then passes to the primary extraction stage 16. The stripped organic 125 is split to pass a portion thereof to the solvent extraction 27. The raffinate from the solvent extraction 27 is added to the loaded organic 123 from the solvent extraction 16 prior to the wash 42. The wash water 47 from the wash 42 is passed to the pressure oxidation filter 24, to serve as a feed wash water onto the filter 24. The resultant wash filtrate is added to the pressure oxidation filtrate 29, thus recovering the copper and chloride content from the solvent extraction wash water (47).

The raffinate 43 from the secondary solvent extraction stage 18 is neutralized again in a secondary neutralization stage 46, this time at pH 10 and filtered at 48 to remove all dissolved heavy metals, producing a solution 51 which is used as wash water in the CCD circuit 34 for washing the final leach residue 35. The solid residue from the filtration 48 is discarded, as shown at 53.

Stripping of the loaded and washed organic at 44 is effected by means of spent acid or electrolyte 55 from the electrowinning stage 20 to obtain a pure copper sulphate solution or pregnant electrolyte 57 which is then passed to the electrowinning stage 20 for electrowinning in the usual way.

It can be seen that all solution streams in the process are thus recycled and there are no solution effluents from the process. Only solid residues are discarded from the process.

Process Mode B

Figure 2:
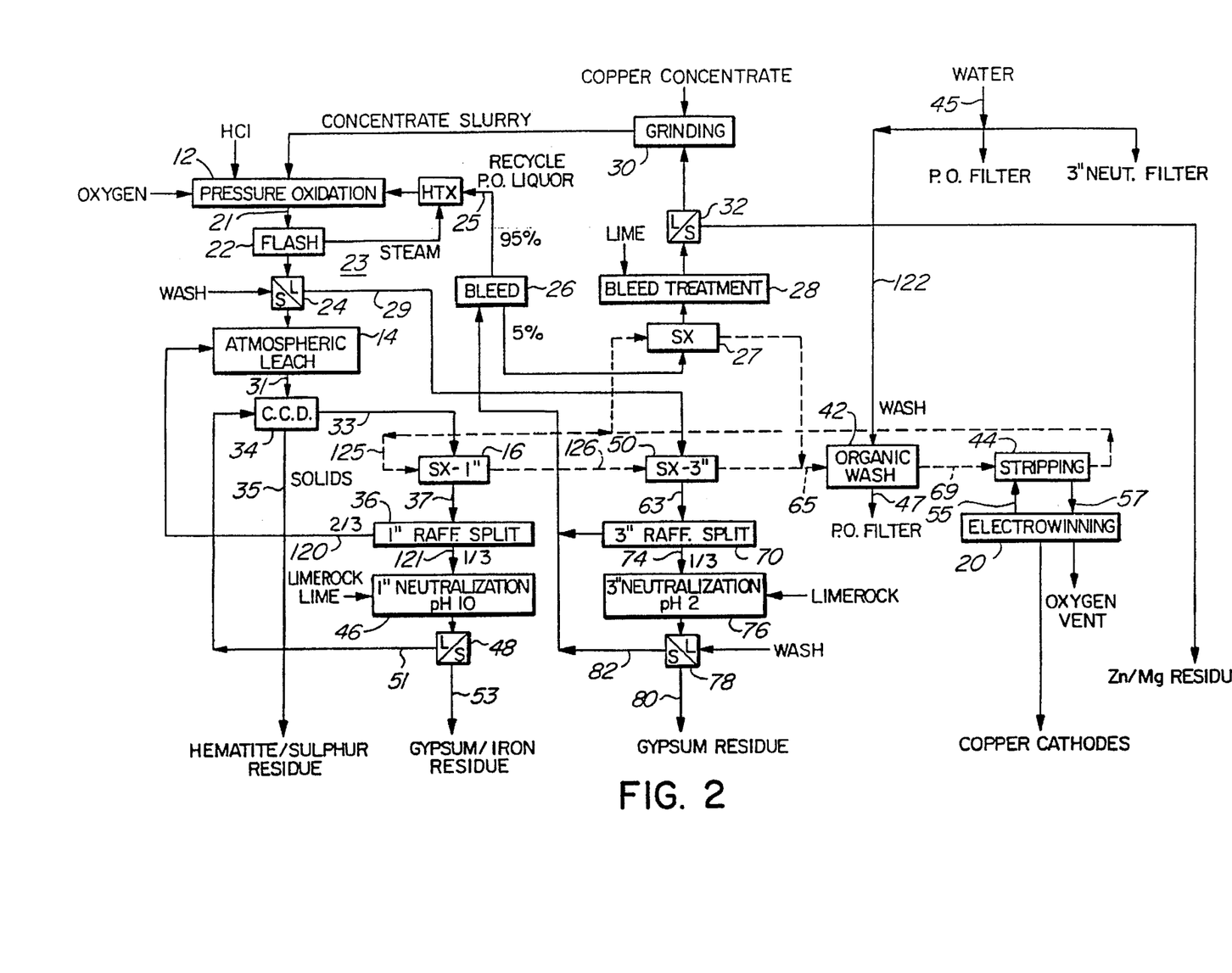
FIG. 2 is a flow diagram of a hydrometallurgical copper extraction process according to another embodiment of the invention, which is suitable for the treatment of medium and lower grade copper ores or concentrates.

FIG. 2 is a flow diagram of Mode B. The same reference numerals are used to indicate stages or steps in the process which correspond with those in the previous embodiment of FIG. 1. For example, the pressure oxidation stage is again indicated by 12, the atmospheric leach stage by 14, the electrowinning stage by 20, the flash tank(s) by 22, the pressure oxidation filtration by 24, the bleed treatment of the pressure oxidation filtrate 29 by reference numeral 28, the grinding stage by reference numeral 30 and the CCD wash circuit by reference numeral 34.

In this mode of the process, the pressure oxidation 12 is carried out both to oxidize and to leach into solution most of the copper contained in the feed concentrate. Typically about 85–90% of the copper is leached into the solution, with only about 10–15% being left in the residue as the basic copper sulphate.

The conditions of the pressure oxidation stage 12 in the autoclave are similar to those in Process Mode A except that the percentage solids is lower, i.e. 150–225 g/L.

In this mode of the process, $\Delta[Cu^{2+}]$ is typically 30 to 40 g/L Cu, i.e. the copper concentration is greater in the product solution 21 from the pressure oxidation stage 12. The feed solution 25 to the pressure oxidation stage 12 typically contains 10–15 g/L Cu and 12 g/L Cl, together with about 20 to 30 g/L sulphuric acid.

In this mode, no sulphuric acid is added to the pressure oxidation stage 12 from an external source, as is the case with the FIG. 1 embodiment. In this mode, the acid is obtained from recycle in the process, i.e. by the recycle of the pressure oxidation filtrate 29. The product solution 21 from the pressure oxidation stage 12 contains about 40 to 50 g/L Cu and 11 to 12 g/L Cl at about pH 2 to 2.5.

The copper leached into the product liquor 21 from pressure oxidation stage 12 must be controlled so as to obtain the desired distribution of copper between liquor (85 to 90%) and residue (10 to 15%). This distribution results in a small but important amount of basic copper sulphate solids in the leach residue. The pH is a convenient indicator of the presence of basic copper sulphate, since it is a buffering agent. With strong copper sulphate concentration in solution, a pH range of 2 to 2.5 indicates basic copper sulphate. Below pH 2 almost all the basic copper sulphate will be dissolved, whereas above pH 2.5, too much basic copper sulphate is formed and insufficient copper is likely to be found in the solution 21.

The primary method of control is the amount of acid in the feed liquor 25 to the pressure oxidation stage 12. The acid level in turn is controlled by the degree of neutralization of the raffinate from solvent extraction of the pressure oxidation filtrate 29 raffinate described below. Usually, about 25 to 50% of the acid must be neutralized, depending on the amount of acid that is required.

The acid generated during the pressure oxidation stage 12 varies from one concentrate to another and according to conditions employed. If the concentrate produces a large amount of acid during the pressure oxidation stage 12, then the feed solution 25 will need less acid to achieve the desired result. The minimum copper (from concentrate feed) that should go to liquor 21 is about 10%. Below 10%, the pH drops sufficiently low so that iron concentrations in the pressure oxidation filtrate 29 increase rapidly. Normally, iron is about 10 to 50 ppm, but if pH is below 2 and basic copper sulphate in residue disappears, then iron can increase to above 1 g/L fairly quickly. This is undesirable because there are several impurity elements such as As and Sb which are only removed from solution simultaneously with iron hydrolysis. Therefore, absence of iron in solution is a good guarantee of low impurity content in the pressure oxidation filtrate 29. Iron is also an impurity itself that must be avoided in the electrowinning circuit 20 as far as possible.

There is another factor, however, which places a maximum on Cu in solution. It has been found surprisingly that certain concentrates actually leach more completely if the copper concentration is lower. This is believed to be due to either formation of secondary CuS, as described above, or to some other phenomenon related to poor oxidation characteristics of the primary mineral, chalcopyrite, in high copper concentration solutions. It is found that elemental 10 sulphur, produced during the reaction in the pressure oxidation stage 12, can coat or actually encapsulate unreacted chalcopyrite particles and hinder the access of reagents. This results in poor copper recovery. The phenomenon is apparently accentuated by high Cu levels in solution. It can be overcome or mitigated by the use of surfactants, as described above. The problem is more severe with some concentrates, particularly high grade, than others. Therefore, for these concentrates it is desirable to limit the copper concentration in the pressure oxidation filtrate (i.e. greater than about 95%) over all. To do this, it is necessary to have a substantial proportion of the copper as basic copper sulphate, i.e. in solid residue from the pressure oxidation stage 12 rather than the pressure oxidation filtrate. Typically, 20–40% of copper may report to solids, if necessary, to keep the copper concentration low enough to obtain high copper recovery.

Higher grade concentrates exhibit the problem of low copper recovery with high copper in solution. Therefore, an increasing proportion of copper must report to solids as the grade increases. Tests with three different concentrates illustrate this relationship:

|         |      | H⁺/Cu | Cu Distribution % | | Total |
|---------|------|-------|-----------|------------|-----------|
| Conc. # | % Cu | Molar | PO liquor | PO residue | recovered |
| 1 | 41 | 0.55 | 0  | 100 | 97.3 |
| 2 | 28 | 0.70 | 63 | 37  | 95.7 |
| 3 | 22 | 0.96 | 85 | 15  | 94.7 |

The H⁺/Cu molar ratio refers to H⁺ in the feed acid and Cu in the feed concentrate. The H⁺ in the feed acid is taken to be all the protons available on complete dissociation of the acid even if under existing conditions the acid is not completely dissociated. The H⁺ shown in the table is optimum level found by experiment to give the best results.

For concentrate #1, which was a high grade concentrate, the process chosen is Mode A, where all of the copper reports to the leach liquor and $\Delta[Cu^{2+}]=0$. The H⁺/Cu ratio is that found which was necessary by experimentation to give the desired result of $\Delta[Cu^{2+}]=0$.

For concentrate #2, a medium grade concentrate, Mode B was chosen, but with a substantial amount of the copper reporting to the solid basic copper sulphate. This was achieved by keeping the H⁺/Cu ratio low enough so that not all of the copper dissolved into the liquor.

For concentrate #3, a low grade concentrate, Mode B was also chosen but in this case, the minimum amount of copper reported to the residue, by adjusting the H⁺/Cu ratio high enough.

The residue from the pressure oxidation stage 12 is leached 14 with raffinate 37 returning from the solvent extraction 16 which is dilute acid, at 3–10 g/L $H_2SO_4$. Since most of the copper from the pressure oxidation stage 12 reports to the pressure oxidation filtrate 29 and only a small fraction of the pressure oxidation residue, the resultant leach liquor 31 from the atmospheric leach 14 is quite dilute in copper. In turn, this produces a dilute raffinate 37 from the solvent extraction 16. Typically, the atmospheric leach liquor 31 is 3–7 g/L Cu and 0.2 to 0.5 g/L Fe.

The slurry resulting from the atmospheric leaching stage 14 is difficult to filter, as was the case with Mode A. Good liquid/solid separation and washing, however, can be achieved as before using a series of thickeners in a CCD arrangement 34. Wash water 51 is provided by raffinate from the solvent extraction 16, which is neutralized, as indicated at 46. This is similar as in Mode A. The only major difference is the lower tenor of the solution 33 and the reduced volume.

The solution 33 produced by the atmospheric leaching stage 14 is subjected to the solvent extraction 16. The copper containing solution 29 from the pressure oxidation stage 12, is subject to a solvent extraction stage 50. There are, therefore, two solvent extraction operations, i.e. 16 and 50, treating two different streams of liquor 33 and 29, respectively. It is a feature of the process according to the invention that the organic extractant used for effecting the solvent extraction operations is common to both solvent extractions 16 and 50.

As shown in FIG. 2, the stripped organic 125 coming from the common stripping operation 44 is first introduced into the solvent extraction circuit 16, which has the weakest copper concentration in the aqueous feed stream 33 and therefore needs the organic extractant to be as low as possible in loading to be effective.

The loaded organic 126 from solvent extraction 16 is then sent to the solvent extraction 50 where it contacts the higher copper concentration liquor 29. It is not necessary for the solvent extraction 50 to achieve a high extraction ratio because the raffinate 63 from this extraction is recycled to the pressure oxidation stage 12, as shown. On the other hand, the raffinate 37 from the solvent extraction 16 is only partly recycled and part is neutralized 46 to remove excess acid from the circuit. Therefore, it is more important to achieve high copper recovery from the solvent extraction 16.

The raffinate 37 from the solvent extraction 16 is split at 36 as in Mode A, with about one-third 121 to the neutralization 46 and two-thirds 120 recycled to the atmospheric leach stage 14. An important difference from Mode A is that the raffinate 37 from solvent extraction 16 is sufficiently low in copper, i.e. below 100 ppm, so that it is not necessary to have a secondary solvent extraction stage before neutralization 46, as was the case in Mode A. This is due to the lower copper concentration and solution volume, allowing the solvent extraction 16 to be more efficient.

The loaded organic 65 produced by the two solvent extraction operations 16, 50 in series, is washed in two stages in counter current fashion with dilute acidic aqueous solution 122, as shown at 42. This is primarily to remove entrained aqueous solution from the loaded organic 65 and in particular to reduce the chloride content before the organic goes to stripping at 44. The amount of wash water required is about 1–3% of the organic volume. The resultant wash liquor 47 produced is recycled to the pressure oxidation stage 12.

The washed organic 69 is stripped at 44 with spent electrolyte 55 from the electrowinning stage 20 to provide a pure copper solution or pregnant electrolyte 57 for electrowinning in the usual way.

The raffinate 63 is split at 70 in two portions 72, 74 as determined by the required molar ratio of H⁺/Cu. The portion 72 is recycled to the pressure oxidation stage 12. The portion 74 is neutralized at pH 2 with limerock at 76 and filtered 78. The solid residue is washed and discarded, as shown at 80. The filtrate 82 is recycled with the portion 72 to form the feed solution 25 to the pressure oxidation stage 12.

A novel feature of the process, therefore, is the use of a common organic to extract copper from two separate aqueous feed liquors. This provides considerable economies in lower capital and operating costs in the solvent extraction circuits. Also, it allows for the use of copious amounts of water in the atmospheric leaching CCD circuit, so that good washing can be achieved on the final residue and yet still recover copper from such a dilute liquor.

It has been found that the degree of sulphur oxidation that occurs in the pressure oxidation stage 12 is highly dependent on the type of concentrate, such as grade and mineralogy of the concentrate being treated, as well as the conditions of the pressure oxidation stage 12. Certain concentrates exhibit considerably higher sulphur oxidation, i.e. oxidation of the sulphur in the concentrate to sulphate, and the effect is particularly marked with the low grade concentrates with less than about 28% Cu by weight. The inventor has found that the significance of this variation is not so much the copper grade itself but the copper/sulphur ratio in the concentrate. The main impurity elements in a copper concentrate are iron and sulphur due to the fact that copper ores are generally composed of chalcopyrite together with other minerals, particularly pyrite $FeS_2$ or pyrrholite FeS.

Process Mode B deals with the problem of excess sulphur oxidation in the pressure oxidation stage 12 when lower grade concentrates are used by deliberately dissolving 90% of the copper and minimizing the formation of basic copper sulphate. The reaction for chalcopyrite is:

$$CuFeS_2 + 5/4 O_2 + H_2SO_4 \rightarrow CuSO_4 + 1/2 Fe_2O_3 + 2S^0 + H_2O \qquad (6)$$

The filtrate 29 from the pressure oxidation stage 12 thus contains high levels of copper sulphate and copper chloride and this is treated in the solvent extraction stage 50 to produce a pure copper sulphate solution which goes to the electrowinning stage 20.

Figure 3:
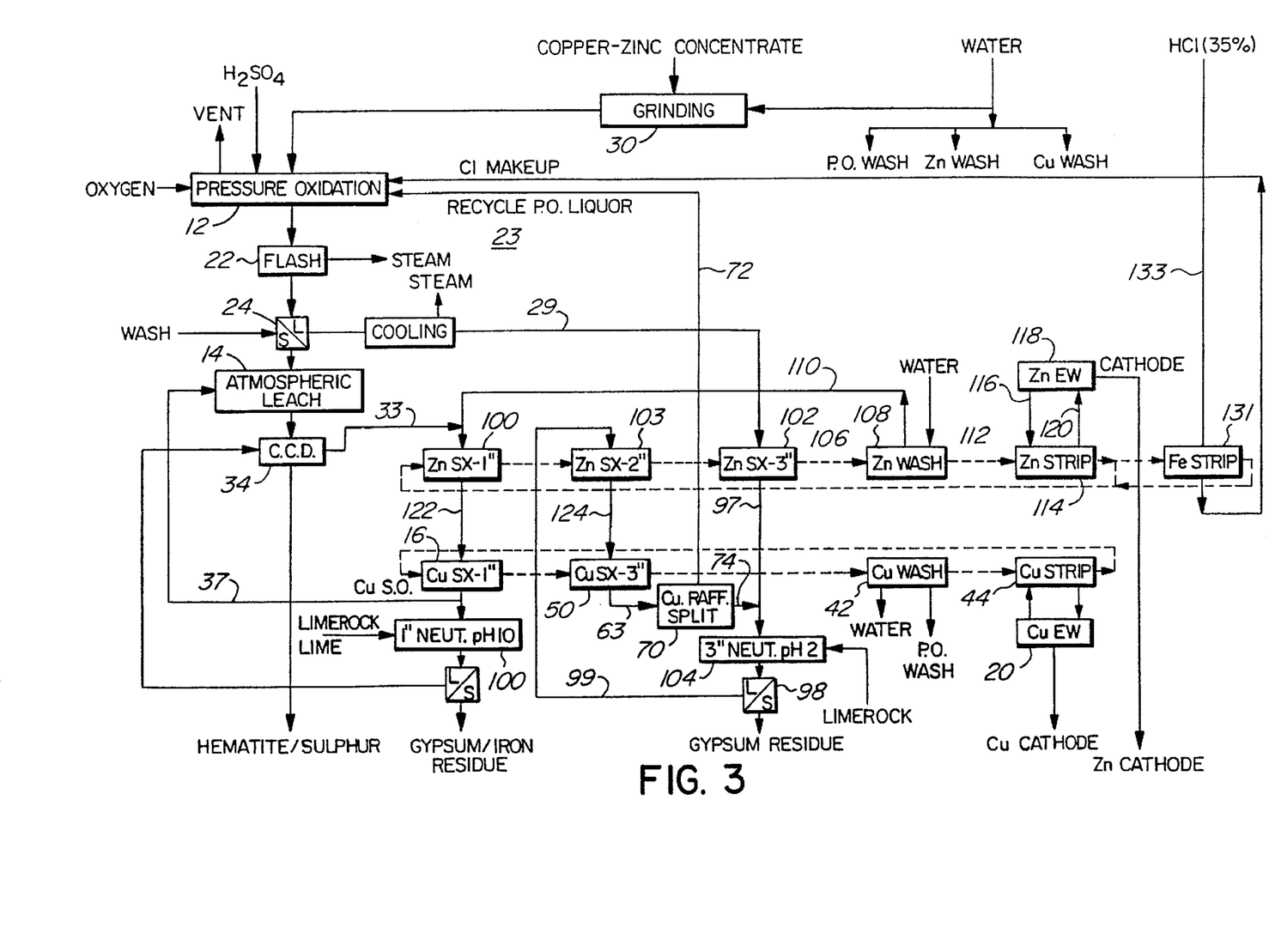
FIG. 3 is a flow diagram of a hydrometallurgical copper extraction process according to a further embodiment of the invention, which provides for the extraction of zinc in addition to copper.

With reference to FIG. 3, a hydro-metallurgical process for extraction of zinc in addition to copper is shown. The same reference numerals are used to indicate stages or steps in the process which correspond with those in the previous embodiments.

The concentrate is re-ground 30 as in the case of the previous embodiments.

The pressure oxidation of a mixed zinc-copper concentrate is carried out in similar fashion as for the concentrate containing only copper as in FIG. 2.

Zinc oxidizes as readily or more readily than copper does and is more likely to report to the leach liquor 29 as opposed to the pressure oxidation residue. This is because zinc hydrolyzes less readily as basic zinc sulphate than copper does, i.e. at higher pH.

Recovery of copper or zinc is not hampered by high solution tenors apparently as was found for high grade copper concentrations. Therefore, it is possible to have most of the copper and zinc report to the pressure oxidation filtrate 29, i.e. as in Process Mode B. Sulphur oxidation is low, so that the amount of acid generated within the pressure oxidation stage 12 is low. Hence, to obtain a high $H^+$/Cu ratio, it is necessary to recycle virtually all of the acid from the solvent extraction stage 12 with minimal neutralization. The feed acid may be as high as 75 g/L $H_2SO_4$ with about 10 g/L Cu, 5 g/L Zn and 12 g/L Cl.

The pressure oxidation filtrate 29 will contain both zinc and copper in substantial concentrations dependent on the feed concentrate composition. For a concentrate with 20% Cu and 5% Zn, the pressure oxidation filtrate 29 may contain about 50 g/L Cu, 15 g/L Zn and 12 g/L Cl.

The pressure oxidation residue is leached 14 in the same way using raffinate 37 from the solvent extraction 16 as shown, producing a mixed Cu-Zn solution for feed to the solvent extraction circuits. Zinc is extracted first and then copper.

There are two aqueous streams to be treated by solvent extraction as in Process Mode B for copper concentrates. The pressure oxidation filtrate 29 contains high tenors of Cu and Zn, whereas the atmospheric leach solution 33 is weak in both elements.

The novel arrangement outlined for the solvent extraction circuit as for the embodiments described above, is continued for the zinc solvent extraction, that is, the weak liquor is contacted first with organic extractant followed by the strong aqueous liquor. In this case, there are two circuits, one for zinc and one for copper.

It is possible to extract copper first followed by zinc, depending on the choice of organic extractant and its relative affinity for the two elements. The applicant has found that satisfactory results can be obtained by using DEHPA (diethyl-hexyl phosphoric acid) as the first extractant, which is selective towards zinc over copper. Therefore, two DEHPA extractions 100 and 102 are done, the first extraction 100 is on the weak liquor 33 and the second extraction 102 is on the stronger liquor 29 from the pressure oxidation stage 12, to recover zinc and leave the bulk of the copper in solution.

The zinc extraction by DEHPA is hampered by poor extraction characteristics in the presence of high acid concentrations. In practice, this means that the extraction effectively stops at about pH 1.4 or about 7–10 g/L $H_2SO_4$. To deal with this problem, an interstage neutralization 104 at pH 2 is included for the zinc solvent extraction. Thus, the zinc solvent extraction occurs in two stages, i.e. the stage 102 and a second stage 103 with the neutralization 104 in between. Each stage 102, 103 will extract only 5–7 g/L zinc before being stopped by the resultant acid concentration in the raffinate. By using interstage neutralization 104, the total zinc extraction can be increased to 10 g/L Zn or more. The raffinate 97 from the first extraction stage 102 is neutralized to about pH 2 to 2.5 at 104 with inexpensive limerock ($CaCO_3$) to produce gypsum solids which are filtered off at 98 and discarded. The filtrate 99 is then fed to the second solvent extraction stage 103. The feed to the second stage is typically 10 g/L Zn and 50 g/L Cu at a pH of 2 to 2.5. After extraction, the second raffinate 124 is typically 5 g/L Zn, 50 g/L Cu and 8 g/L acid.

For the solvent extraction circuit 16, zinc concentrations are low enough so that this does not present a problem.

The optimum zinc content of the pressure oxidation filtrate 29 is determined largely by the ability of the zinc solvent extraction circuit to extract the zinc. Due to the fact that zinc is extracted quite weakly by the available extractants (e.g. DEHPA), there is a maximum of about 5–7 g/L Zn that can be extracted before the reaction stops due to acid buildup in the raffinate. Further extraction requires neutralization of the acid. With interstage neutralization it is possible to extract much higher levels of Zn, however, the interstage neutralization removes sulphate from the circuit which must be replaced either by sulphur oxidation or adding fresh acid to the pressure oxidation circuit 23.

One inter-neutralization stage is likely to be compatible with sulphate balance, therefore it is preferable to keep the $\Delta[Zn^{2+}]$, which is the zinc concentration in the pressure oxidation filtrate 29 minus the zinc concentration in the recycled raffinate 72, to about 10 g/L. Thus, if the feed acid to pressure oxidation recycled as raffinate 72 from solvent extraction contains 5 g/L Zn, then the product filtrate 29 from pressure oxidation should contain about 15 g/L Zn. This restriction on $\Delta[Zn]$ distinguishes the process for Zn compared to Cu. The greater extraction ability of Cu solvent extraction means that good extraction of Cu can be achieved with much higher acid levels, up to 75 g/L $H_2SO_4$ in raffinate compared to only about 7–10 g/L for Zn. Hence Cu can be extracted from 50 g/L Cu feed streams.

After extraction, the loaded organic 106 from the Zn (DEHPA) circuit contains some Cu, as a result of imperfect selectivity of the DEHPA extractant towards Zn, and simple entrainment of the strong Cu liquor. Typically the Zn/Cu ratio in the loaded organic 106 from Zn solvent extraction is about 150 to 300:1. If not removed, all of the Cu will be stripped along with the Zn during solvent stripping 114, and thus will be stripped into the Zn pregnant electrolyte 120 which is fed to Zn electrowinning 118. Zn electrowinning requires a very pure pregnant electrolyte if it is to produce satisfactory (pure) Zn cathode at reasonable current efficiency. The Zn/Cu ratio must be about 100,000:1 in pregnant electrolyte. Therefore it is essential to remove almost all of the Cu either from the loaded organic 106 or later from the pregnant electrolyte before electrowinning. It is much easier to purify the loaded organic 106.

To remove this copper, several washing or treatment stages 106, e.g. 3 to 10, typically 5, are needed. Washing is done with dilute acidified zinc sulphate aqueous solution. The wash stages are arranged in series, i.e. the treated organic exiting from the first wash stage enters the second wash stage and so through all the other stages until the organic exits the last stage. Some zinc is washed out with the copper, therefore, it is necessary to minimize the amount of wash water added and make use of several wash stages arranged in counter current fashion instead.

The resultant wash liquor 110 produced is recycled to the atmospheric leach circuit for recovery of copper and zinc values.

After washing, the organic stream 112 from the DEHPA extraction is ready for stripping 114 with spent electrolyte 116 from a zinc electrowinning circuit 118. This produces a pregnant electrolyte 120 for electrowinning zinc at high current efficiency.

After the stripping 114 the extraction solvent is further stripped 131 for removal or iron prior to recycling of the extractant to the solvent extraction 100. The stripping 131 is effected with HCl makeup solution 133 which is introduced into the pressure oxidation stage.

The raffinates 122, 124 from the zinc extractions with DEHPA are each extracted with a selective copper extractant, such as LIX™, in solvent extractions 16 and 50, respectively.

The design of these two circuits 16, 50 is similar as in Process Mode B with a common organic used first in the solvent extraction 16 and then in the solvent extraction 50. The loaded organic is then washed and stripped as before as shown at 42 and 44, respectively.

Neutralization requirements in the solvent extraction 50 circuit are found to be low because of the prior neutralization in the zinc circuit.

The raffinates from the LIX™ extractions are recycled as before back to the pressure oxidation stage 12 and the atmospheric leach stage 14, respectively.

Figure 4:
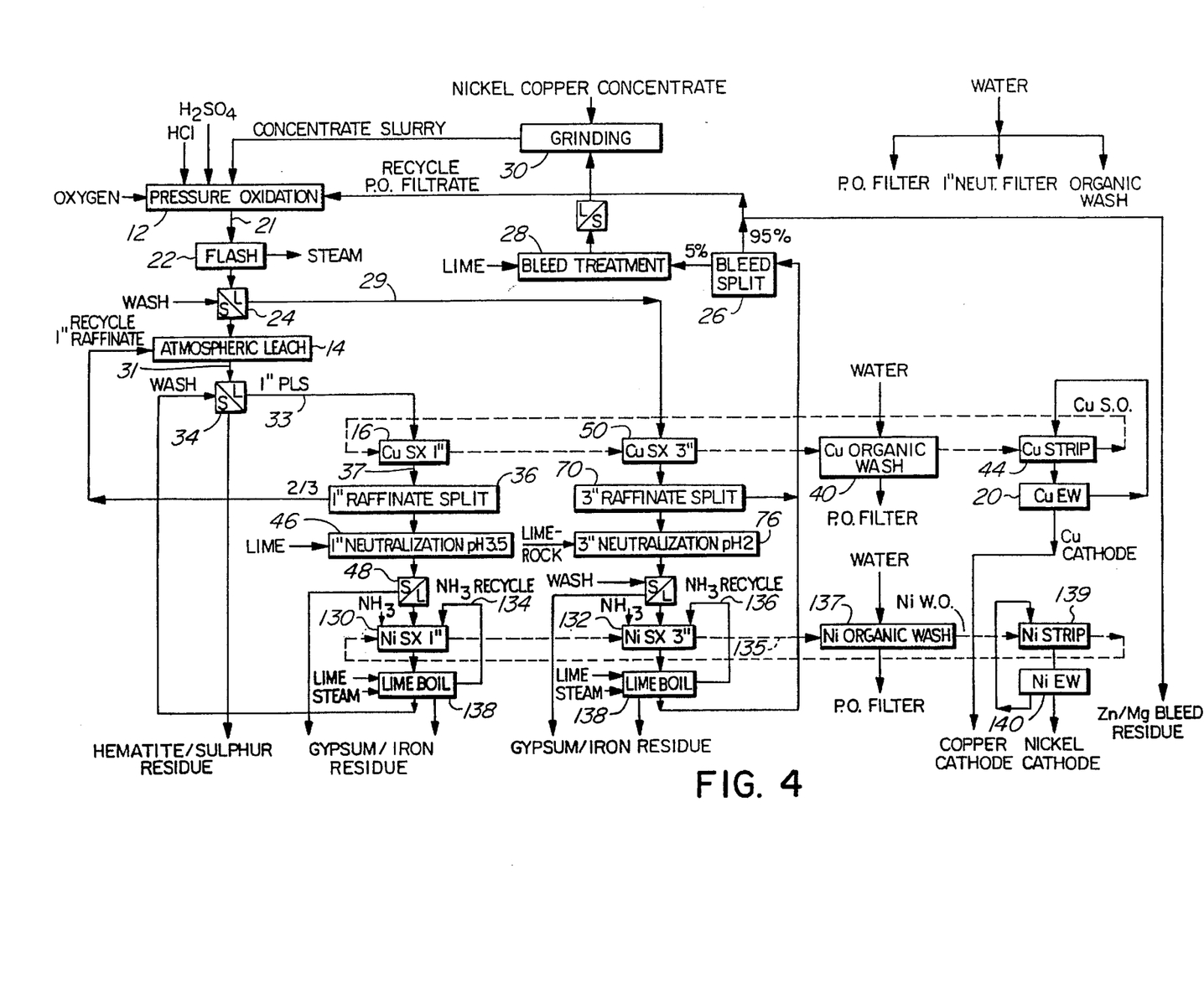
FIG. 4 is a flow diagram of a hydrometallurgical copper extraction process according to another embodiment of the invention, which provides for the extraction of nickel in addition to copper.

With reference to FIG. 4, a hydrometallurgical extraction process for recovery of nickel in addition to copper is shown.

The same reference numerals are used to indicate stages or steps in the process which correspond with those in the previous embodiments.

For nickel-copper concentrates, the process is very similar as for zinc, except that the available solvent extraction agents are all less selective toward nickel than copper. Therefore, the nickel solvent extraction circuits 130, 132 both are positioned after the respective copper solvent extraction circuits, 16, 50, respectively.

The loaded nickel extractant 135 from the solvent extraction 132 is subject to a wash 137 and then stripped 139 before being recycled to the solvent extraction 130. The stripping 139 is effected with spent electrolyte from the nickel electrowinning 140.

In addition, nickel extraction is sufficiently weak that in situ neutralization with ammonia, for example, is required, as indicated at 134 and 136, respectively. The ammonia must be recovered from the respective raffinates by a lime boil process 138, for example, and recycled.

It has been found that there is a limit to the amount of sulphur oxidation that can be accommodated by the process Mode B. If the sulphur oxidation is high enough and sufficient acid is generated during pressure oxidation, there will be a surplus of acid left over after pressure oxidation, even if no acid is added to the feed, such as in the form of acidic raffinate. In this situation, not only will all the copper in the concentrate be converted to dissolved copper sulphate, but also some of the iron in the concentrate will be solubilized by the surplus acid, e.g. as ferric sulphate.

It is desirable that iron in the concentrate report to the pressure oxidation residue as stable hematite, $Fe_2O_3$, and not to the solution, where it must be separated from the copper. Typical concentrates have an Fe:Cu ratio of at least 1:1, and therefore the efficient and complete elimination of Fe at an early stage is an important aspect of the process. Other impurities such as arsenic, antimony, etc., are also removed with iron by co-adsorption or precipitation mechanisms.

It has been found that some concentrates, however, exhibit so much sulphur oxidation (acid generation) that the acid-consuming capacity of pressure oxidation is exceeded, and some iron is leached into solution, even under process Mode B conditions. It is a target of the process to produce a low-iron liquor, typically with 0.05 g/L Fe. Some concentrates which have been tested have produced pressure oxidation liquors with 1.0 to 12.0 g/L Fe. Similarly the pH of the pressure oxidation liquor is normally targeted to be in the range 2.0 to 3.5, corresponding to less than 1 g/L free acid, but concentrates tested have produced pressure oxidation liquors with pH in the range 1.2–2.0, corresponding to 1 to 15 g/L free acid.

Accordingly, a further embodiment of the process has been developed, termed "process Mode C" for the treatment of the above concentrates, termed "Mode C" concentrates. Process Mode C will now be described below.

Process Mode C

The Mode C concentrates that exhibit a strong tendency towards sulphur oxidation and hence acid generation are those with a high S:Cu ratio, or more generally S:M ratio, where M=base metals, such as Cu, Zn, Ni, Co, Pb, etc., but not including Fe, which does not consume acid.

Nickel or nickel/copper concentrates may often be Mode C, because they are frequently low-grade, with S:M ratio often about 2:1 or higher. Some copper or copper/gold concentrates are also Mode C, if they are low grade because of high pyrite content. Some copper/zinc concentrates have also been found to be high in pyrite and hence of Mode C type as well.

In general there is a correlation between pyrite ($FeS_2$) content and the tendency toward Mode C type behaviour. However, there are also exceptions to this trend, as not all pyrites react in the same way. Some pyrites oxidize sulphur more readily than others. In contrast, pyrrhotite ($Fe_7S_8$) or the related iron-zinc mineral sphalerite, (Zn, Fe)S, appear to result in much less sulphur oxidation, and thus exhibit Process Mode A behaviour.

Process Mode C is essentially a special case of Process Mode B, with two key features.

First, all the raffinate 63 (FIG. 2) is neutralized, before returning this stream to the pressure 12 oxidation, (i.e. none is bypassed).

Secondly, the pressure oxidation slurry (before filtration of leach residue) is subjected to an extra neutralization, the pressure oxidation neutralization, to neutralize excess acid and precipitate any Fe in solution at this time. The pressure oxidation neutralization is done as hot as practical, once the slurry has been discharged from the autoclave. The most convenient opportunity is in the conditioning tank after flash let-down to atmospheric pressure, when the slurry is at or near the boiling point of the solution, i.e. about 100° C.

Limerock is used for this purpose, to neutralize any surplus acid in the pressure oxidation slurry and thus bring the pH up to about 3. Simultaneously, any dissolved Fe present in the $Fe^{3+}$ state will be precipitated, along with any As or Sb that may be present.

The principal products of these reactions are precipitated gypsum and iron hydroxides or basic salts. Since the pressure oxidation neutralization is done before filtration, these solids are mixed in with the leach residues already present in the pressure oxidation slurry, containing mostly elemental sulphur, hematite, unreacted sulphides (pyrite), and any gangue minerals (quartz, feldspars, etc., which are largely unchanged by pressure oxidation). This mixing is advantageous as no additional filtration step is required, and the other solids aid in the filtration of the pressure oxidation neutralization products, which might otherwise tend to filter poorly.

The resultant slurry, now at pH 3 is filtered and the filter cake carefully washed, as always, to remove entrained liquor (Cu, Cl) as much as practical. The filter cake proceeds to atmospheric leaching where any precipitated copper is leached as usual at about pH 1.5–1.8, and the resultant washed thoroughly in a CCD circuit. The filtrate 29 from the pressure oxidation filtration is treated as in Process Mode B for Cu removal by the solvent extraction stage 50, producing a raffinate 63 that then goes to neutralization 76 as before, and then recycled back to the pressure oxidation 12, but without the raffinate split 70, as indicated above. Thus the pressure oxidation cycle is completed.

The important aspects of the process according to the invention can be summarized as follows:

(i) oxidize completely all base metals contained in sulphide concentrates, e.g. copper, nickel, zinc and cobalt, as well as iron; and (ii) minimize the oxidation of sulphur to sulphate and maximize the production of elemental sulphur; and (iii) precipitate the metals oxidized during pressure oxidation as the basic salt, e.g. basic copper sulphate; or (iv) solubilize the metals oxidized during pressure oxidation, as the sulphate compound, e.g. zinc sulphate or nickel sulphate.

Although the pressure oxidation is chloride catalyzed, it does not use a strong chloride solution, e.g., only about 12 g/L is needed which will support about 11 g/L Cu or Zn as the respective chloride salt. If a higher concentration of metals is needed or produced, it is as the sulphate salt. Thus, the pressure oxidation solutions are generally mixtures of the sulphate and chloride salts, not pure chlorides.

The process according to the invention can be used to process concentrates containing nickel alone or in combination with copper or cobalt. Similarly, copperzinc concentrates can be processed. This is achieved by the correct use of sulphate or sulphuric acid during pressure oxidation in the presence of a halogen, such as chloride. Insufficient acid or sulphate increases sulphur oxidation, which is undesirable, as well as reduces metal oxidation and hence metal recovery. Excess acid solubilizes iron from the pressure oxidation slurry and causes unnecessary expense in cost of acid and neutralizing agent.

Copper-Nickel Concentrates

Figure 5:
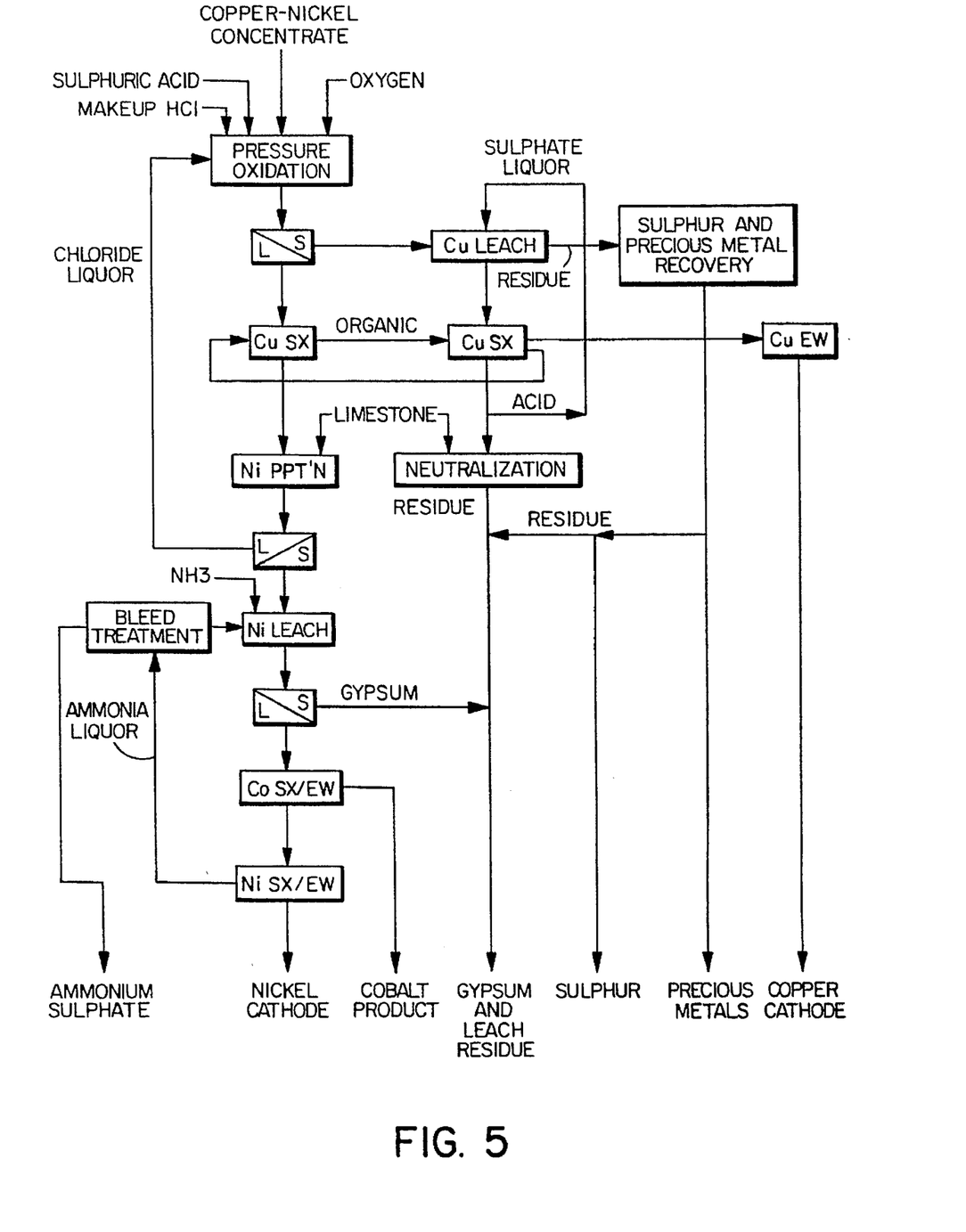
FIG. 5 is a flow diagram of a hydrometallurgical process for the extraction of metals from a copper-nickel sulphide concentrate according to another embodiment of the invention.

The process flowsheet is shown as FIG. 5. It is intended for concentrates containing 3–25% Cu and 3–10% Ni, with Cu predominant. Generally cobalt is present at a Ni:Co ratio of between 10:1 and 30:1, which corresponds to about 0.1 to 0.8% Co in concentrate.

The process essentially is variation of Process Mode B above, where Cu reports primarily to the liquor during pressure oxidation, rather than to the solid product. Acid must be supplied to pressure oxidation to enable both the Ni and Cu to solubilize primarily as sulphate. Typically about 20–30 g/L acid as $H_2SO_4$ is added to pressure oxidation feed solution. Chloride addition to pressure oxidation is sufficient to maintain 12 g/L Cl, same as for Cu concentrates. Conditions of temperature, pressure, etc., are also similar as for Cu concentrates. Co solubilizes along with Ni.

The pressure oxidation liquor is treated first for Cu solvent extraction, to remove essentially of the Cu, and then Ni is precipitated as Basic Nickel sulphate, after first reheating to 85 to 90° C., using limestone. Co is precipitated along with Ni as a basic cobalt salt.

The precipitated basic nickel/cobalt sulphate is then leached in an ammoniacal solution recycled from Ni solvent extraction. The resultant Ni/Co leach liquor is then treated first for Co removal by solvent extraction using a reagent specific for Co such as Cyanex 272, a proprietary phosphinic acid from Cyanamid Inc. The Co raffinate is then treated for Ni recovery by another solvent extraction reagent, LIX 84, a proprietary hydroxy-oxime from Henkel Corp.

Finally, the Ni raffinate is recycled to the Ni/Co leach. There is a bleed of this raffinate which is treated to recover Ammonium Sulphate which otherwise would build up in the circuit. This is due to the introduction of sulphate ions in the basic nickel sulphate filter cake. Ammonia must be added to make up for the loss of ammonia in the ammonium sulphate.

Nickel-Copper Concentrates

Figure 6:
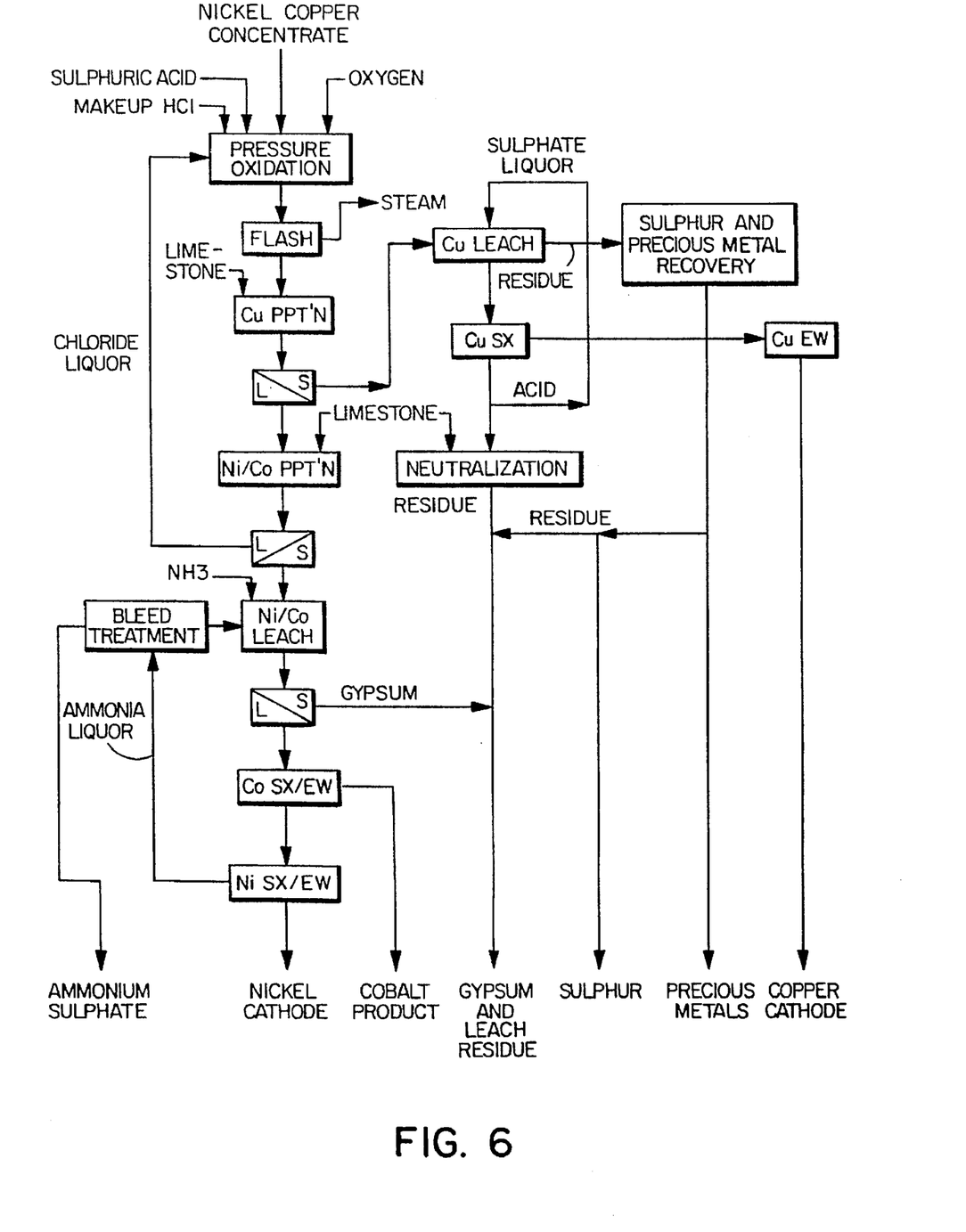
FIG. 6 is a flow diagram of a hydrometallurgical process for the extraction of metals from a nickel-copper sulphide concentrate according to another embodiment of the invention.

Nickel-copper concentrates have Ni as the predominant element and will contain about 8–25% Ni and 3–10% Cu. The process flowsheet is shown in FIG. 6. Conditions in pressure oxidation are essentially the same as for Copper-nickel concentrates. The difference from FIG. 3 lies in the treatment of the pressure oxidation slurry.

These concentrates generally behave as in Process Mode A, in which Cu reports primarily to the solid phase after pressure oxidation. This is accomplished by addition of limerock to the pressure oxidation slurry to raise the pH to about pH4, before the slurry is filtered. This has the effect of neutralizing excess acid in pressure oxidation liquor; precipitating any Fe; and precipitating any Cu.

The neutralized slurry is filtered and the filter cake sent to atmospheric leach, labelled a "copper leach" which in turn produces a leach liquor for extraction by Cu solvent extraction.

The neutralized solution is treated for Ni/Co recovery by precipitation and solvent extraction as for copper-nickel concentrates.

Nickel Laterite Ores

Figure 7:
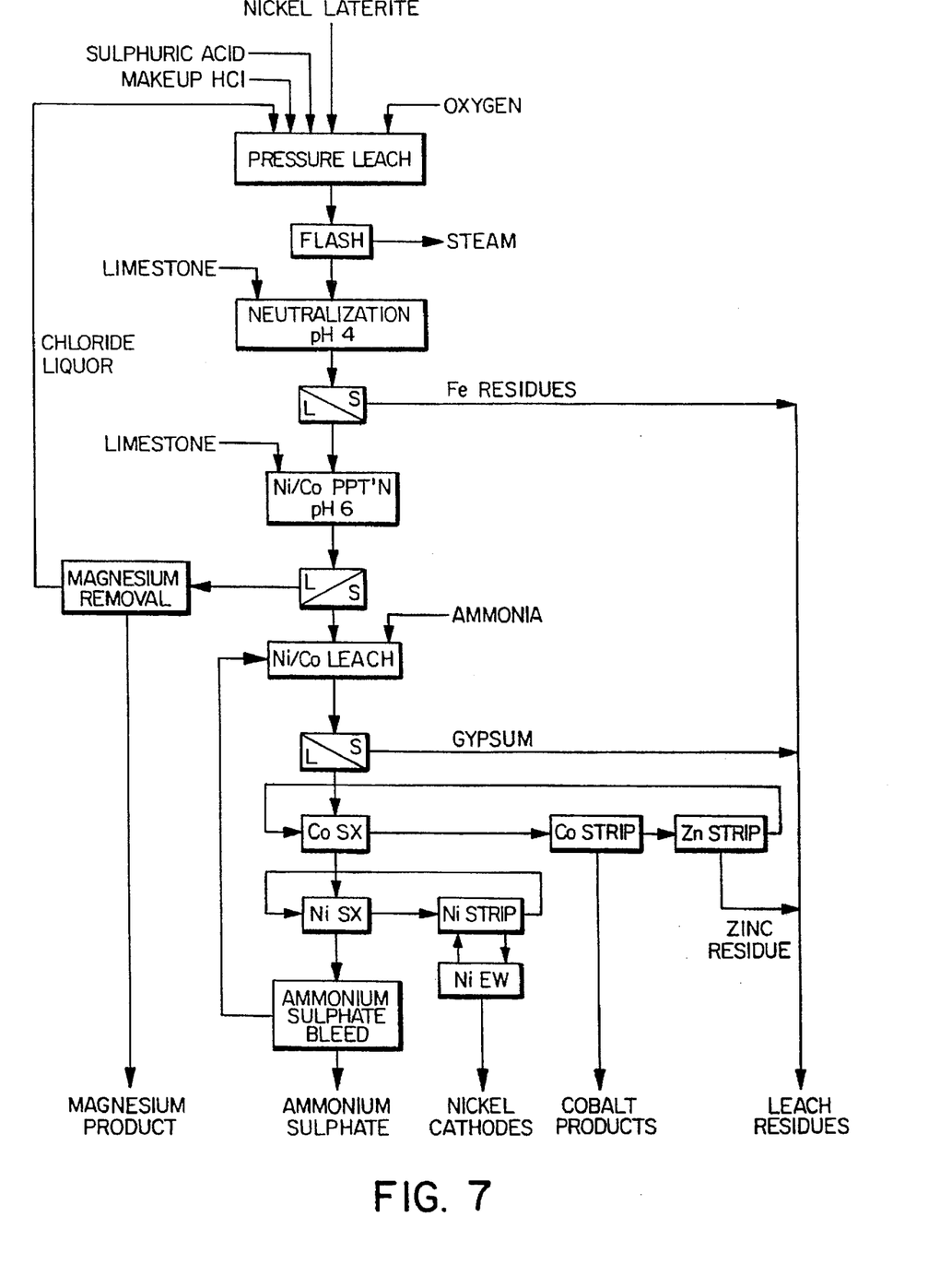
FIG. 7 is a flow diagram of a hydrometallurgical process for the extraction of metals from a nickel laterite ore according to another embodiment of the invention.

Nickel laterites do not concentrate by flotation as sulphides do and therefore have to be treated as a whole ore. Typically they contain 1.5–3.0% Ni, and 0.1–0.3% Co, with negligible Cu. An important feature is Mg content which can be up to 20% Mg, as well as substantial Fe content. The flowsheet is shown in FIG. 7.

The process is similar to that used for Nickel-copper sulphide concentrates, except that the absence of Cu means that the leach residue, after neutralization and filtration can be discarded as it has negligible metal values in Cu. There are also important differences in the conditions used in pressure oxidation: Temperature and pressure are much higher at 225° C./450 psig $O_2$, and much higher acidity at 100 to 200 g/L free acid in feed liquor. Chloride content stays the same at about 12 g/L Cl. Chloride in leach liquor may be supplied as $MgCl_2$ or HCl.

The other main difference is the need for a Mg removal step. Mg leaches almost quantitatively into solution during pressure oxidation, resulting in typically 40 g/L Mg per pass. This can be removed evaporation/crystallization for example as $MgSO_4$.

Copper-Zinc Concentrates

Figure 8:
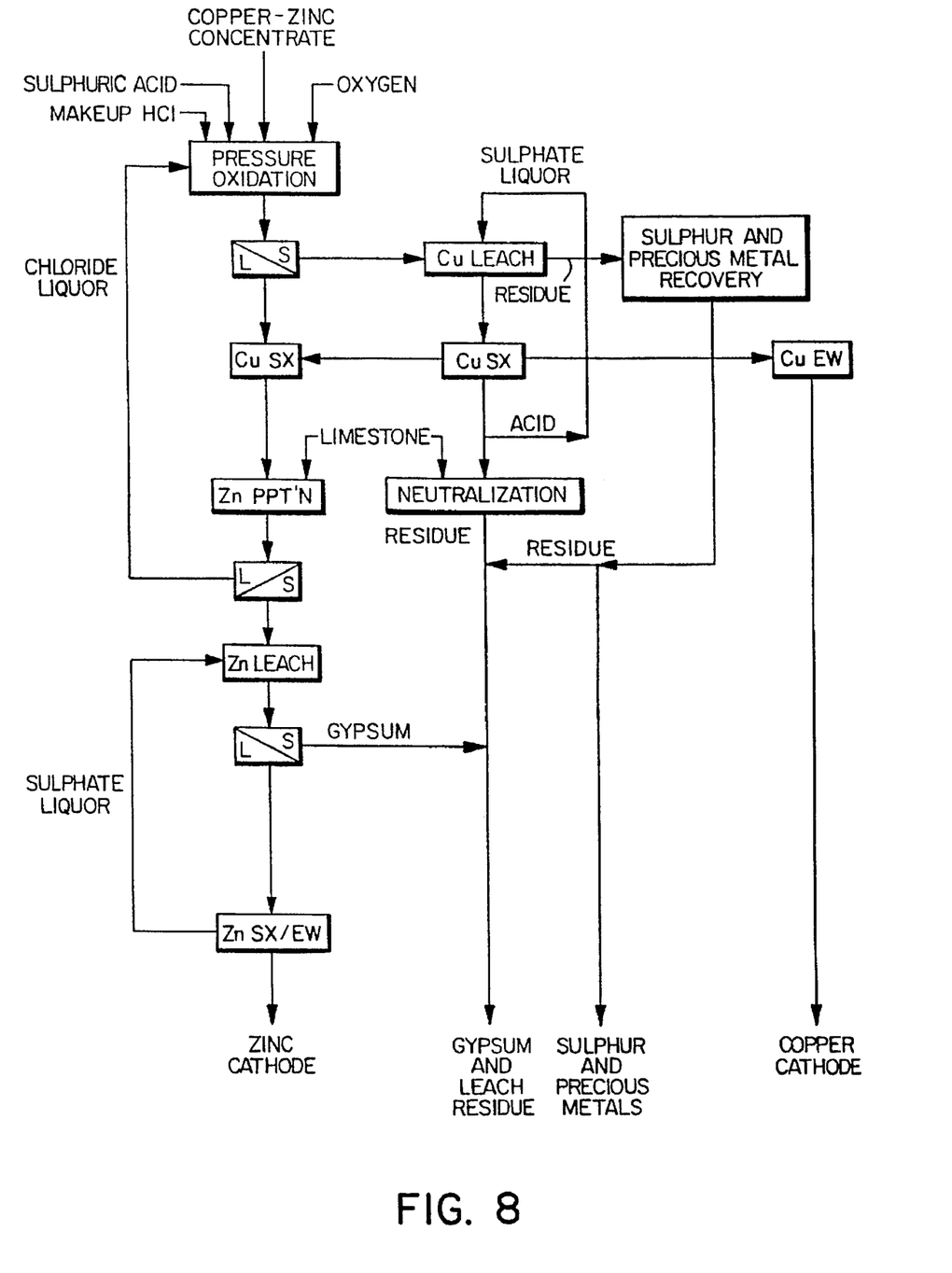
FIG. 8 is a flow diagram of a hydrometallurgical process for the extraction of metals from a copper-zinc sulphide concentrate according to another embodiment of the invention.

Copper-Zinc concentrates with 20–25% Cu and 1–10% Zn are treated by Process Mode B type flowsheet, as shown in FIG. 8.

It has been found that excellent extraction of Zn in pressure oxidation can be achieved so long as enough acid is added to the feed solution that the final pH of the slurry is below about pH 2. Otherwise, the conditions are similar as for Cu concentrates, i.e., 150° C. 200 psig $O_2$, 12 g/L Cl.

In Process Mode B flowsheets, the Cu is primarily solubilized during PO, and must be extracted by solvent extraction 50 This solvent extraction is operated in conjunction with Cu solvent extraction that extracts Cu from the leach liquor coming from atmospheric leach ("Cu Leach").

Zinc, having been solubilized during pressure oxidation along with Cu, is precipitated from the Cu raffinate as Basic Zinc sulphate by limestone at pH 6 and at 85°–90° C. The Zn ppt is then leached by acid raffinate returning from Zn solvent extraction circuit. The Zn leach liquor is then extracted by Zn solvent extraction producing a loaded Zn organic (DEHPA). This organic stream must be carefully purified of Cu, Co, Cd, Cl, etc., before stripping with spent acid from electrowinning. The purification is done by scrubbing the loaded organic using $ZnSO_4$ aqueous solution.

While only preferred embodiments of the invention have been described herein in detail, the invention is not limited thereby and modifications can be made within the scope of the attached claims.

What is claimed is:

1. A process for the extraction of a non-cuprous metal from a metal ore or concentrate, comprising the step of subjecting the ore or concentrate to pressure oxidation in the presence of oxygen and an acidic solution containing halogen ions and a source of bisulphate or sulphate ions to form a solution of said non-cuprous metal, wherein said source of bisulphate or sulphate ions is selected from the group consisting of sulphuric acid and a metal sulphate which hydrolizes in said acidic solution.

2. The process according to claim 1, wherein said halogen is selected from chlorine and bromine.

3. The process according to claim 1, wherein the non-cuprous metal is zinc and further comprising the steps of precipitating zinc from said solution of non-cuprous metal in the form of a basic zinc sulphate; separating the basic zinc sulphate from the remainder of said solution; and leaching zinc from said basic zinc sulphate to produce a solution of zinc ions.

4. The process according to claim 3, further comprising the steps of extracting zinc from said solution of zinc ions by means of an organic extractant; and stripping zinc from said extractant to produce a concentrated solution of zinc ions for electrowinning.

5. The process according to claim 3, wherein said solution of non-cuprous metal also contains copper ions and further comprising the step of removing said copper ions from solution prior to said precipitation of zinc as the basic zinc sulphate.

6. The process according to claim 5, wherein the copper ions are removed by solvent extraction.

7. The process according to claim 5, wherein the copper ions are removed by selective precipitation of copper.

8. The process according to claim 1, wherein the non-cuprous metal is nickel and further comprising the steps of precipitating nickel from said solution of non-cuprous metal in the form of a basic nickel sulphate; separating the basic nickel sulphate from the remainder of said solution; and leaching nickel from said basic nickel sulphate to produce a solution of nickel ions.

9. The process according to claim 8, wherein said solution of non-cuprous metal also contains copper ions and further comprising the step of removing said copper ions from solution prior to said precipitation of nickel as the basic nickel sulphate.

10. The process according to claim 9, wherein the copper ions are removed by selective precipitation of copper.

11. The process according to claim 1, wherein the non-cuprous metal is cobalt and further comprising the steps of precipitating cobalt from said solution of non-cuprous metal in the form of a basic cobalt sulphate; separating the basic cobalt sulphate from the remainder of said solution; and leaching cobalt from said basic cobalt sulphate to produce a solution of cobalt ions.

12. The process according to claim 11, wherein said solution of non-cuprous metal also contains copper ions and further comprising the step of removing said copper ions from solution prior to said precipitation of cobalt as the basic cobalt sulphate.

13. The process according to claim 12, wherein the copper ions are removed by selective precipitation of copper.

14. The process according to claim 11, wherein the halogen ion concentration is about 12 g/L.

15. The process according to claim 1, wherein the non-cuprous metal is a mixture of nickel and cobalt and further comprising the steps of precipitating nickel and cobalt from said solution of non-cuprous metal in the form of basic nickel and cobalt salts; separating the basic nickel and cobalt salts from the remainder of said solution; and leaching nickel and cobalt from said basic nickel and cobalt sulphates to produce a solution of nickel and cobalt ions.

16. The process according to claim 15 further comprising the step of separating said nickel and cobalt ions by selective solvent extraction to produce separate nickel and cobalt solutions for electrowinning.

17. The process according to claim 1, wherein the halogen concentration is in the range of about 8 g/L to about 20 g/L.

18. The process according to claim 1, wherein said source of bisulphate or sulphate ions is generated by the metal ore or concentrate during said pressure oxidation.

* * * * *